UNITED STATES PATENT OFFICE.

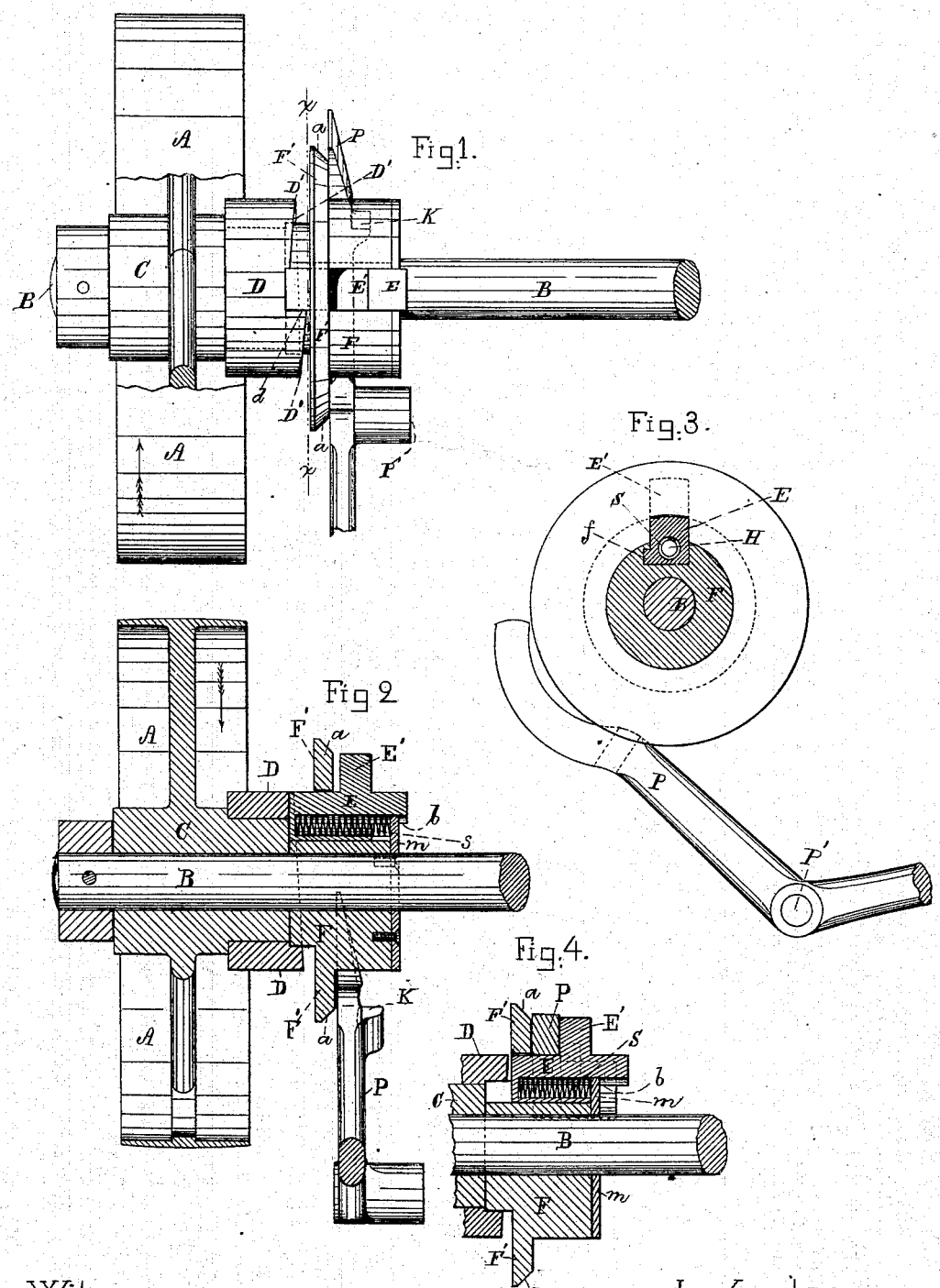

ORRIL R. CHAPLIN, OF BOSTON, MASSACHUSETTS.

CLUTCH MECHANISM.

SPECIFICATION forming part of Letters Patent No. 277,002, dated May 8, 1883.

Application filed September 23, 1882. (No model.)

*To all whom it may concern:*

Be it known that I, ORRIL R. CHAPLIN, of Boston, in the county of Suffolk, State of Massachusetts, have invented a new and useful Improvement in Clutch Mechanism, of which the following is a full, clear, concise, and exact description, taken in connection with the drawings accompanying and forming a part hereof, of which—

Figure 1 is a top view, showing the clutch operating to make a pulley fast on its shaft. Fig. 2 is a vertical section of Fig. 1 lengthwise of the shaft. Fig. 3 is a cross-section on line $x\,x$, Fig. 1. Fig. 4 is also a lengthwise section, showing the clutch-bolt thrown back by the lever and the pulley loose on the shaft.

My invention is shown applied to a driving-pulley, and affords a very quick working and effective means of making a pulley fast or loose on its shaft, thus enabling the operator to stop or start his machine with rapidity and precision. It will be more readily understood by reference to the drawings.

A is a pulley set on shaft B. The hub C of the pulley is provided with a collar, D, secured to it. The free edge of the collar projects slightly beyond the hub, and is cam-shaped, as shown at D'. A recess, into which the end of the clutch-bolt E fits when the pulley is fast, is made in the cam-shaped edge beside the shoulder $d$. The shaft B is provided with a collar, F, secured to it, which carries in a slot across its periphery the clutch-bolt E, the bolt being provided at one side with a flange, $f$, which fits into a corresponding recess in the slot and acts to prevent the bolt from leaving the slot. The bolt E has a tubular recess, H, running lengthwise of it from its free end to a point near the opposite end, and arranged to receive a spiral spring, S, one end of which bears against the closed end of the recess and the other against a projection, $m$, which rises from and is fast to the collar F. The bolt E is cut away, at $b$, at its free end, beneath the outer end of the recess, to accommodate the projection $m$ as the clutch-bolt is thrown back. The spring acts constantly to force the clutch-bolt forward toward the cam-shaped edge of the collar, fast to the hub of the pulley. The clutch-bolt E is provided on its upper side with a projection, E', cast with it, and rounded slightly at one corner, where it receives the point of the shipper-lever P. The collar F, fast to the shaft, is provided with a circular flange, F', projecting from its periphery at the side nearest the pulley. The edge of the flange is cut off and slopes inward on the side which is toward the projection E' on the clutch-bolt, as shown at $a$. This inclined edge renders it more certain that the taking end of the shipper-lever P can be thrown inward to the collar F into a position to come in contact with the projection E' on the clutch-bolt. The clutch-bolt E slides back and forth in its slot underneath the flange, the purpose of the flange being to take all lateral pressure off the shipper-lever when it is thrown into position to draw the clutch-bolt and free the pulley. The shipper-lever is of the form shown, and is pivoted at P', in any convenient way, to a stud, or to the frame of the machine, so that its taking end may be thrown toward or away from the collar on the shaft.

The operation of the clutch is as folllows: The mechanism being in the position shown in Fig. 1—that is, with the pulley fast to the shaft—to free the pulley and stop the machine the end of the shipper-lever is thrown toward the collar on the shaft. During the following revolution of the shaft the inclined end of the lever is thrust between the projection E' on the clutch-bolt and the flange F'. The projection rides the incline on the lever end until it strikes the shoulder K on the lever, which stops the shaft, the clutch-bolt being thrown back and freed from the pulley as the projection E' rides the incline of the lever end. The pulley is then loose on the shaft. If, now, the shipper-lever be thrown away from the collar on the shaft, freeing the clutch-bolt, the spring S in the bolt acts to force the clutch toward and against the cam edge of collar D, fast to the hub of the pulley, which is revolving in the direction indicated by the arrow. It will be plain that before the pulley has completed a revolution the clutch-bolt will bear against the shoulder $d$ of the cam-shaped edge and the pulley will be fast on the shaft.

What I claim is—

1. In a clutch mechanism, the combination of the beveled flange F', collar F, and shipper-lever, for the purposes and substantially as set forth.

2. The combination of clutch-bolt, provided with flange $f$, spring, and shipper-lever, as set forth.

3. The combination of clutch-bolt, spring, shipper-lever, and flange F', fast to the collar on the shaft, as shown and described.

4. The combination of collar D, fast to the hub of the pulley, and provided with a cam-shaped edge, clutch-bolt E, and collar F on the shaft, substantially as described, and for the purposes set forth.

5. The collar D, fast to the pulley, in combination with the clutch-bolt, spring, collar F, provided with flange F', and shaft B, all as set forth, and for the purposes described.

6. The pulley C, having fast to its hub the cam-edged collar D, and shaft B, in combination with collar F, clutch-bolt E, provided with flange $f$, spring S, flange F', and shipper-lever P, substantially as described.

ORRIL R. CHAPLIN.

Witnesses:
WM. A. MACLEOD,
ROBERT WALLACE.